US 11,080,945 B2

(12) United States Patent
Kitajima et al.

(10) Patent No.: US 11,080,945 B2
(45) Date of Patent: Aug. 3, 2021

(54) ON-BOARD DEVICE, AUTOMATIC TOLL COLLECTION MACHINE, TOLL COLLECTION SYSTEM, AND TOLL COLLECTION METHOD

(71) Applicant: MITSUBISHI HEAVY INDUSTRIES MACHINERY SYSTEMS, LTD., Kobe (JP)

(72) Inventors: Kazuyoshi Kitajima, Tokyo (JP); Tatsuya Higuchi, Tokyo (JP); Keiji Terasaka, Tokyo (JP); Kyoko Oshima, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 366 days.

(21) Appl. No.: 16/080,487

(22) PCT Filed: Mar. 31, 2016

(86) PCT No.: PCT/JP2016/061634
§ 371 (c)(1),
(2) Date: Aug. 28, 2018

(87) PCT Pub. No.: WO2017/168761
PCT Pub. Date: Oct. 5, 2017

(65) Prior Publication Data
US 2020/0175777 A1 Jun. 4, 2020

(51) Int. Cl.
*G07B 15/06* (2011.01)
*G06K 7/10* (2006.01)
(52) U.S. Cl.
CPC ........ *G07B 15/063* (2013.01); *G06K 7/10297* (2013.01)

(58) Field of Classification Search
CPC ...... G07B 15/00; G07B 15/06; G07B 15/063; G06K 7/10297
See application file for complete search history.

(56) References Cited

U.S. PATENT DOCUMENTS 5,995,898 A * 11/1999 Tuttle ................... G07B 15/063
427/255.31
6,342,844 B1 * 1/2002 Rozin .................. G07B 15/063
340/928

(Continued)

FOREIGN PATENT DOCUMENTS

JP 2005-309824 A 11/2005
JP 2009-015490 A 1/2009

OTHER PUBLICATIONS

PCT/ISA/210, "International Search Report for International Application No. PCT/JP2016/061634," dated Jul. 19, 2016.

(Continued)

*Primary Examiner* — Thien M Le
*Assistant Examiner* — April A Taylor
(74) *Attorney, Agent, or Firm* — Manabu Kanesaka; Benjamin Hauptman; Kenneth Berner

(57) ABSTRACT

An on-board device is equipped with: an RFIC which includes an activation processing unit for outputting an activation signal upon receiving a radio wave for RFID communication and an RF tag function unit for reading prerecorded tag information; an IC card processing unit which is activated on the basis of the activation signal when electric power is supplied thereto from a power supply circuit, and which reads and writes IC card information from and to an IC card; and a communication unit which transmits the tag information and/or the IC card information to an external device.

10 Claims, 8 Drawing Sheets

(56) References Cited

U.S. PATENT DOCUMENTS

| | | | | |
|---|---|---|---|---|
| 6,894,601 B1* | 5/2005 | Grunden | ................ | G07C 5/006 |
| | | | | 307/10.2 |
| 7,178,728 B2* | 2/2007 | Kojima | ................ | G07B 15/063 |
| | | | | 235/384 |
| 2003/0001755 A1* | 1/2003 | Tiernay | ................ | G07B 15/063 |
| | | | | 340/928 |
| 2005/0237223 A1 | 10/2005 | Nishiwaki | | |

OTHER PUBLICATIONS

PCT/ISA/237, "Written Opinion of the International Searching Authority for International Application No. PCT/JP2016/061634," dated Jul. 19, 2016.

* cited by examiner

| IC CARD PROCESSING INFORMATION | |
|---|---|
| CREDIT CARD NUMBER | EXPIRATION DATE |
| **************** | 2018/1/1 |
| ENTRY TOLLGATE NUMBER | DATE AND TIME OF ENTRY |
| 01 | 2015/9/25 10:30 |

ON-BOARD DEVICE, AUTOMATIC TOLL COLLECTION MACHINE, TOLL COLLECTION SYSTEM, AND TOLL COLLECTION METHOD

RELATED APPLICATIONS

The present application is National Phase of International Application No. PCT/JP2016/061634 filed Mar. 31, 2016, the disclosure of which is hereby incorporated by reference herein in its entirety.

TECHNICAL FIELD

The present invention relates to an on-board device, an automatic toll collection machine, a toll collection system, and a toll collection method.

BACKGROUND ART

At entry tollgates and exit tollgates on toll roads including highways, for example, a system has been utilized that is configured to establish, based on a dedicated short range communications (DSRC) method, radio communication (DSRC communication) between an on-board device mounted on a vehicle being traveling and a roadside radio communication device installed above a lane, and to execute toll collection processing based on an electronic settlement style.

One of such widely known systems, as described above, is the electronic toll collection system (ETC (trade name), also known as "automatic toll collection system"). In the electronic toll collection system, on-board device information (e.g., on-board device identifier (ID)) prerecorded in an on-board device, vehicle information (e.g., vehicle type and vehicle number), and integrated circuit (IC) card information (e.g., credit card number and expiration date) read from a dedicated IC card that is inserted into the on-board device, and that conforms to the electronic toll collection system are transmitted from the on-board device, via DSRC communication, to a roadside radio communication device. The roadside radio communication device thus executes toll collection processing for the on-board device based on the on-board device information, the vehicle information, and the IC card information (e.g., see Patent Document 1).

Various methods have been used in the electronic toll collection systems, including, in addition to the electronic toll collection system using DSRC communication, as described above, an electronic toll collection system using radio frequency identifier (RFID) communication. In the electronic toll collection system using RFID communication, a radio frequency (RF) tag prerecorded with a tag identifier (ID) is attached to a vehicle. A roadside radio communication device reads the tag ID from the RF tag via RFID communication. In a management server coupled to the roadside radio communication device via a wide area communication network, toll collection processing is executed by withdrawing an amount of charge calculated as a toll for a toll road from an account number linked to the tag ID read by the roadside radio communication device.

Another system is also developed. In the system, an on-board device and a radio frequency (RF) tag prerecorded with vehicle information are attached to a vehicle. DSRC communication takes place between the on-board device and the roadside radio communication device. RFID communication further takes place between the RF tag and the roadside radio communication device. In this case, the roadside radio communication device reads the vehicle information from the RF tag via RFID communication, as well as obtains on-board device information and IC card information from the on-board device via DSRC communication (e.g., see Patent Document 2).

CITATION LIST

Patent Document

Patent Document 1: JP 2009-15490 A
Patent Document 2: JP 2005-309824 A

DISCLOSURE OF THE INVENTION

Problem to be Solved by the Invention

In the electronic toll collection system using RFID communication described above, toll collection processing is executed based on a user's account number registered and linked to a tag ID. In this case, on a toll road adopted with the electronic toll collection system using RFID communication, the user cannot use his or her IC card to pay a toll for the toll road (e.g., even though the user desires collection processing with the IC card).

In the system using both an RF tag and an on-board device, as described in Patent Document 2, i.e., in the electronic toll collection system using RFID communication described above, collection processing is executed based on an IC card (e.g., even though a user desires collection processing with RF tag information), preventing toll collection processing using the RF tag from being executed.

The present invention provides, on a toll road adopted with a toll collection system configured to execute toll collection processing via RFID communication, an on-board device, an automatic toll collection machine, a toll collection system, and a toll collection method, each configured to execute both toll collection processing using tag information and toll collection processing using an IC card.

Means for Solving Problem

An on-board device (10) according to one aspect of the present invention includes a radio frequency integrated circuit (RFIC) (100) including an activation processing unit (100b) configured to output an activation signal upon receiving a radio wave for radio frequency identifier (RFID) communication, and a radio frequency (RF) tag function unit (100c) configured to read prerecorded tag information; an integrated circuit (IC) card processing unit (121) configured to be activated based on the activation signal when electric power is supplied from a power supply circuit (140), and to read and write IC card processing information from and to an IC card (40); and a communication unit (100a, 110) configured to transmit at least either of the tag information and the IC card processing information to an external device.

With the above described configuration, the IC card processing unit of the on-board device is activated based on an activation signal output from the activation processing unit upon receiving a radio wave for RFID communication. The communication unit transmits at least either of tag information and IC card processing information to the external device. Even on a toll road adopted with a toll collection system configured to execute toll collection processing via RFID communication, not only toll collection processing using tag information, but also toll collection processing using an IC card can be executed.

In the on-board device according to another aspect of the present invention, the RFIC includes an RFID communication unit (100a) as the communication unit. The RFID communication unit is configured to transmit, when the IC card processing information is read by the IC card processing unit, the IC card processing information to the external device.

With the above described configuration, when the on-board device is inserted with an IC card, and IC card processing information is read, the on-board device can execute electronic settlement processing based on the IC card processing information.

In the on-board device according to still another aspect of the present invention, the RFID communication unit is configured to transmit, when the IC card processing information is not read by the IC card processing unit, the tag information to the external device.

With the above described configuration, when no IC card processing information is read due to that no IC card is inserted into the on-board device, for example, the on-board device can execute electronic settlement processing based on the tag information.

Even though an IC card is inserted into the on-board device, when no IC card processing information is read due to that a power supply circuit does not supply electric power or an error has occurred in reading the IC card, for example, the on-board device can execute electronic settlement processing based on tag information.

The on-board device according to still another aspect of the present invention further includes a dedicated short range communications (DSRC) communication unit (110) configured to transmit the IC card processing information read by the IC card processing unit upon receiving a radio wave for DSRC communication.

With the above described configuration, the on-board device can automatically distinguish a toll road adopted with a toll collection system configured to execute toll collection processing via RFID communication and a toll road adopted with a toll collection system configured to execute toll collection processing via DSRC communication to execute electronic settlement processing in accordance with either of the toll collection systems.

In the on-board device according to still another aspect of the present invention, the IC card processing unit is deactivated when no communication takes place between the communication unit and the external device for a certain period of time or longer.

With the above described configuration, in the on-board device, the IC card processing unit is deactivated while no electronic settlement processing is executed, saving electric power to be supplied from the power supply circuit.

An automatic toll collection machine (20) according to still another aspect of the present invention is an automatic toll collection machine configured to execute toll collection processing for an incoming vehicle (A), and includes a radio frequency identifier (RFID) transmission and reception unit (201b) configured to transmit a radio wave for RFID communication at a predetermined interval, and to receive a response wave to the radio wave for RFID communication from an on-board device mounted on the vehicle, and a toll collection and processing unit (211) configured to execute, when the response wave includes tag information, toll collection processing based on the tag information, and to execute, when the response wave includes IC card processing information, toll collection processing based on the IC card processing information.

With the above described configuration, the toll collection and processing unit can execute both toll collection processing based on tag information and toll collection processing based on IC card processing information, based on information transmitted from the on-board device.

A toll collection system according to still another aspect of the present invention includes the on-board device according to any one of the above described aspects, and the automatic toll collection machine according to the above described aspect.

A data communication method according to still another aspect of the present invention includes a step of outputting an activation signal, and of reading prerecorded tag information upon receiving a radio wave for radio frequency identifier (RFID) communication, a step of establishing, when electric power is supplied from a power supply circuit, an activated state based on the activation signal, and of reading and writing integrated circuit (IC) card processing information from and to an IC card, and a step of transmitting at least either of the tag information and the IC card processing information to an external device.

A toll collection method according to still another aspect of the present invention is a toll collection method configured to execute toll collection processing for an incoming vehicle, and includes a step of transmitting a radio wave for radio frequency identifier (RFID) communication at a predetermined interval, and of receiving a response wave to the radio wave for RFID communication from an on-board device mounted on the vehicle, and a step of executing, when the response wave includes tag information, toll collection processing based on the tag information, and of executing, when the response wave includes integrated circuit (IC) card processing information, toll collection processing based on the IC card processing information.

Advantageous Effect of Invention

With the on-board device, the automatic toll collection machine, the toll collection system, and the toll collection method, described above, on a toll road adopted with a toll collection system configured to execute toll collection processing via RFID communication, the toll collection processing using an IC card can be executed.

BRIEF DESCRIPTION OF DRAWINGS

FIG. 4 is a diagram for describing an example of IC card processing information according to the embodiment of the present invention.

BEST MODE(S) FOR CARRYING OUT THE INVENTION

A toll collection system according to an embodiment of the present invention will now be described herein in detail with reference to the drawings.

Overall Configuration of Toll Collection System

Figure 1:
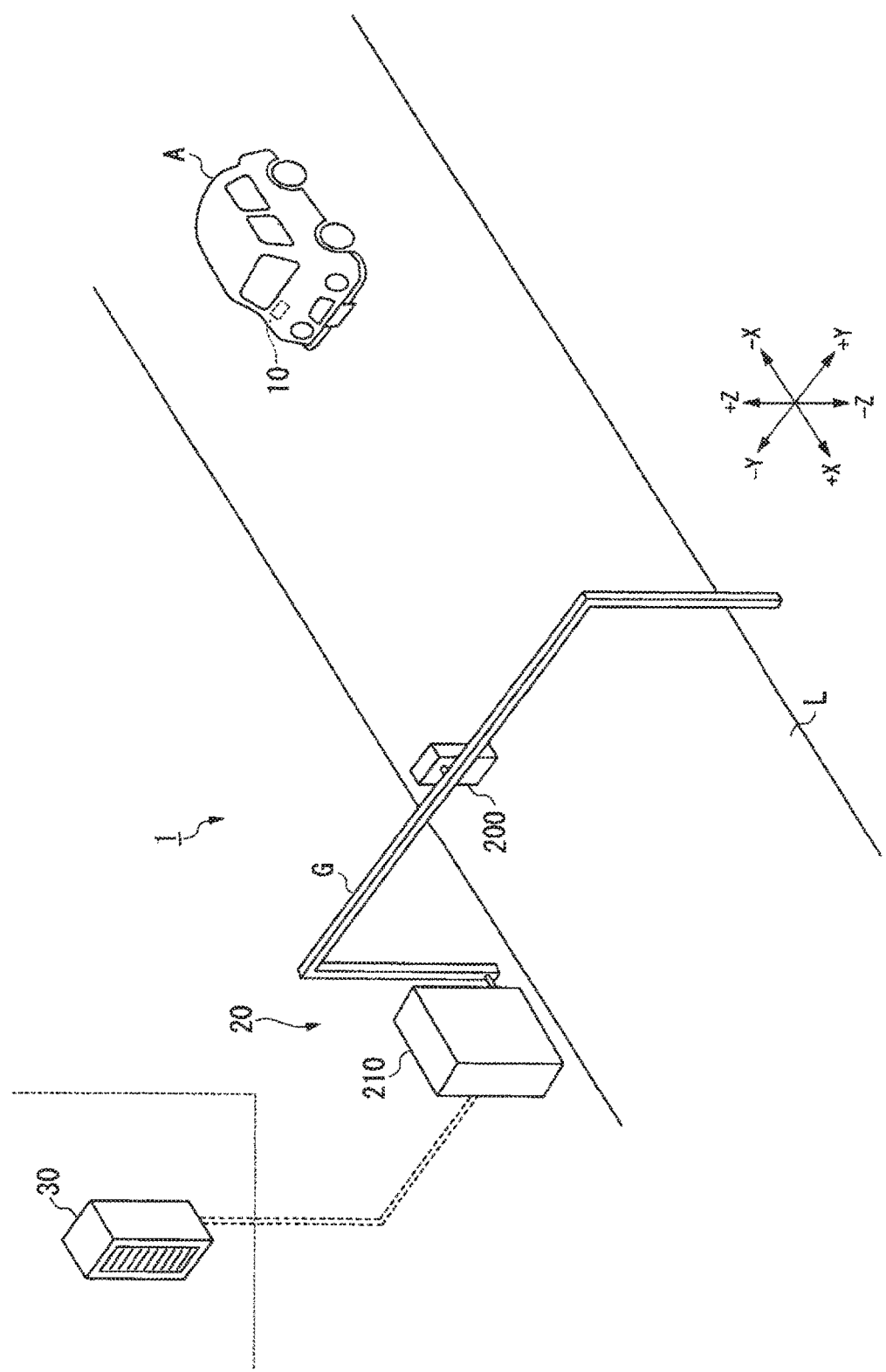
FIG. 1 is a diagram illustrating an overall configuration of a toll collection system according to an embodiment of the present invention.

FIG. 1 is a diagram illustrating an overall configuration of the toll collection system according to the embodiment of the present invention.

A toll collection system 1 according to the present embodiment is an electronic toll collection system installed above a main lane (hereinafter also referred to as a "main road") having a lane L on a toll road. In the present embodiment, the toll collection system 1 according to an aspect will be described. In the aspect, the toll collection system 1 is installed in an exit tollgate on the toll road. However, another embodiment may take another aspect. In the other aspect, the toll collection system 1 is installed in an entry tollgate.

As illustrated in FIG. 1, the toll collection system 1 includes an on-board device 10, an automatic toll collection machine 20, and a management server 30. The on-board device 10 mounted on a vehicle A traveling on the main road (lane L) and the automatic toll collection machine 20 installed on a roadside of the main road (lane L) transmit and receive information to and from each other via radio communications. The automatic toll collection machine 20 is coupled to the management server 30 via a wide area communication network.

As illustrated in FIG. 1, the automatic toll collection machine 20 includes a roadside radio device 200 and a lane control device 210.

The roadside radio device 200 is attached to a gantry G straddling over the lane L in a lane width direction (+/−Y direction in FIG. 1), and is fixed above the lane L. With an antenna (not illustrated), the roadside radio device 200 executes radio communications via radio waves with the on-board device 10 mounted on the vehicle A present within a predetermined communication region on the lane L. Specifically, the roadside radio device 200 executes radio communications via RFID communication with the on-board device 10.

In the present embodiment, an aspect is described. In the aspect, the main road includes the single lane L. The single roadside radio device 200 is provided above the lane L. However, another embodiment may take another aspect. In the other aspect, the main road includes a plurality of lanes. On the plurality of lanes L, one or more roadside radio devices may be provided.

In the present embodiment, an aspect is described. In the aspect, the roadside radio device 200 is fixed above the lane L. However, the present invention is not limited to the aspect. The roadside radio device 200 may be provided on a roadside of the lane L as long as the roadside radio device 200 can execute radio communications with the vehicle A traveling on the lane L.

The lane control device 210 is installed on a roadside of the lane L, and is adjacent to the gantry G. The lane control device 210 is coupled to the roadside radio device 200 in a wired manner, and is configured to transmit and receive information for toll collection processing to and from the on-board device 10 via the roadside radio device 200. The lane control device 210 is further configured to calculate an amount to be charged to the on-board device 10 based on various information obtained from the on-board device 10 to execute toll collection processing.

Functional Configuration of Toll Collection System

Figure 2:
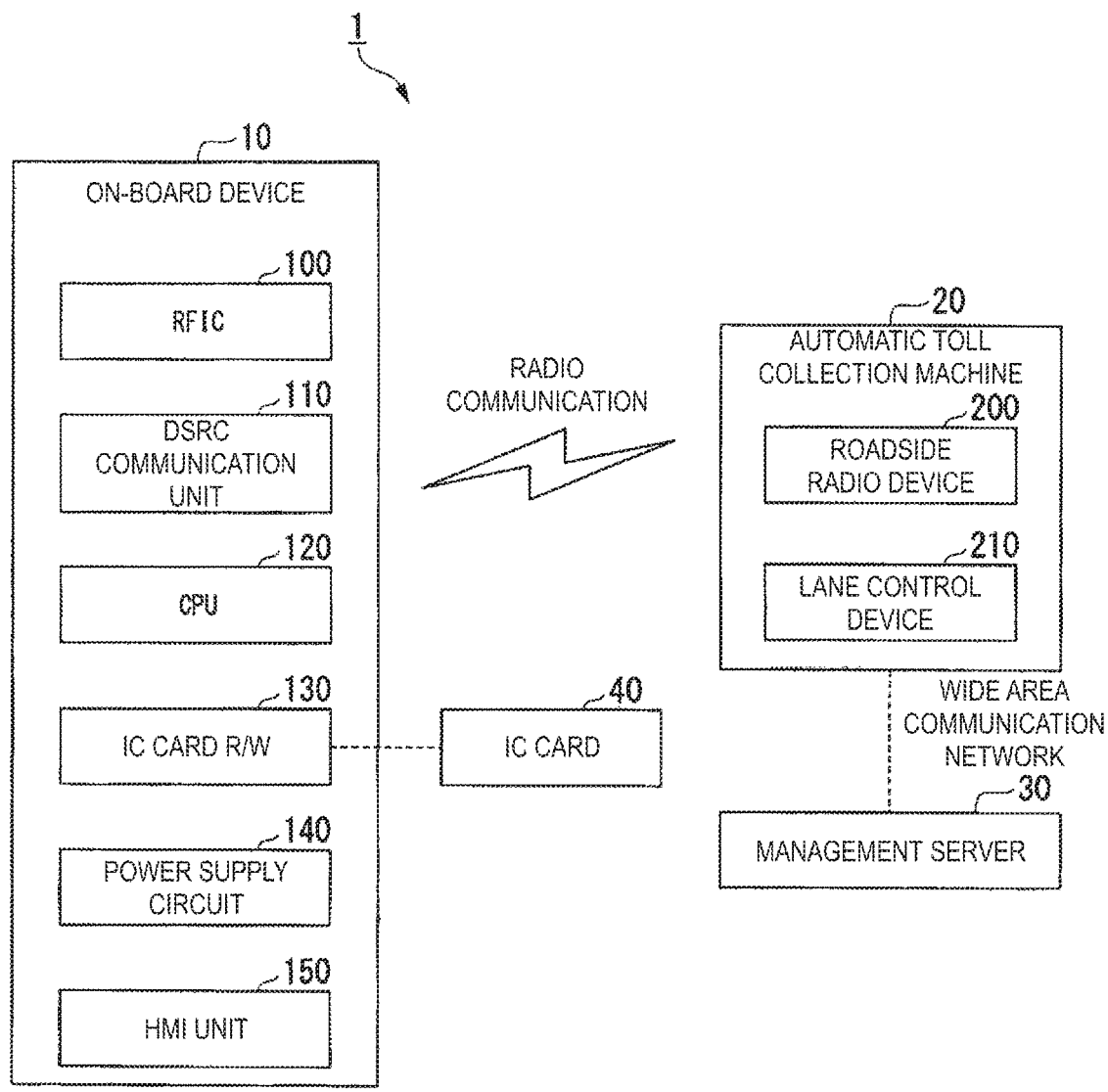
FIG. 2 is a diagram illustrating a functional configuration of the toll collection system according to the embodiment of the present invention.

FIG. 2 is a diagram illustrating a functional configuration of the toll collection system according to the embodiment of the present invention.

As illustrated in FIG. 2, the on-board device 10 of the toll collection system 1 includes a radio frequency integrated circuit (RFIC) 100, a dedicated short range communications (DSRC) communication unit 110 (communication unit), a central processing unit (CPU) 120, an integrated circuit (IC) card reader/writer (R/W) 130, a power supply circuit 140, and a human-machine interface (HMI) unit 150.

The RFIC 100 is prerecorded with tag information (unique tag ID). The tag information identifies the on-board device 10, and functions as an RF tag. The RF tag is readable via RFID communication. The RFIC 100 is configured to transmit and receive information for toll collection processing to and from the automatic toll collection machine 20 via RFID communication.

In the present embodiment, information for toll collection processing refers to information used by the automatic toll collection machine 20 for calculation of an amount to be charged to the on-board device 10. Specifically, information for toll collection processing refers to information including at least either of tag information and IC card processing information read by the on-board device 10 from an IC card 40 possessed by a user. IC card processing information refers to information used by the automatic toll collection machine 20 for execution of toll collection processing with the IC card 40. Specifically, IC card processing information refers to information including a credit card number and an expiration date recorded in the IC card 40, as well as includes entry information indicative of information on an entry tollgate that the vehicle A has passed through to enter a toll road (a tollgate number of the entry tollgate, and a date and a time of entry when the vehicle A has passed through the entry tollgate).

In the present embodiment, when the on-board device 10 executes radio communications with a roadside radio device and a lane control device (not illustrated) provided in an entry tollgate, the on-board device 10 obtains a tollgate number of the entry tollgate and a time of entry as entry information, and records the entry information in the IC card 40. The roadside radio device and the lane control device provided in the entry tollgate transmit the tag information obtained from the on-board device 10 and the entry information linked to each other to the management server 30.

A functional configuration of the automatic toll collection machine 20 will be described later.

The DSRC communication unit 110 is configured to transmit and receive IC card processing information (credit card number, expiration date, and entry information) to and from an existing automatic toll collection machine configured to execute toll collection processing via DSRC communication (hereinafter referred to as a DSRC roadside device). The DSRC roadside device refers to the roadside radio communication device (automatic toll collection machine) described in Patent Document 1, described above, for example. In the present embodiment, a tollgate is provided with either the DSRC roadside device or the automatic toll collection machine 20 configured to execute toll collection processing via RFID communication.

The CPU 120 is configured to transmit and receive information for toll collection processing to and from an external device via the RFIC 100 or the DSRC communication unit 110. In the present embodiment, the external device refers to the automatic toll collection machine 20 or the DSRC roadside device.

The IC card R/W 130 is configured to read and write IC card processing information from and to the IC card 40. Specifically, the IC card R/W 130 writes entry information to the IC card 40, and reads a credit card number, an expiration date, and entry information recorded in the IC card 40.

The power supply circuit 140 includes a battery (primary battery or secondary battery) (not illustrated), and is configured to supply electric power to components of the on-board device 10. In another embodiment, the power supply circuit 140 may be supplied with electric power from a battery of the vehicle A, for example.

The HMI unit 150 is configured to notify to a user a result of toll collection processing executed for the on-board device 10.

A functional configuration of the components of the on-board device 10 will be described later.

As illustrated in FIG. 2, the automatic toll collection machine 20 of the toll collection system 1 includes the roadside radio device 200 and the lane control device 210.

The roadside radio device 200 is configured to obtain information for toll collection processing received from the on-board device 10 via RFID communication.

The lane control device 210 is configured to obtain information including at least either of the tag information and the IC card processing information from the on-board device 10 via the roadside radio device 200. The lane control device 210 is further configured to calculate an amount to be charged to the on-board device 10 based on the tag information or the IC card processing information obtained from the on-board device 10 to execute toll collection processing.

The lane control device 210 is further configured to transmit the tag information or the IC card processing information obtained from the on-board device 10 and information including the amount to be charged to the on-board device 10 to the management server 30.

The management server 30 is prerecorded with the tag information of the on-board device 10 and an account number of the user of the on-board device 10 linked to each other. The management server 30 is further prerecorded with the entry information and the tag information of the on-board device 10 linked to each other. The entry information and the tag information are transmitted from the roadside radio device and the lane control device provided in the entry tollgate. Upon receiving the information including the tag information and the amount of charge from the lane control device 210, the management server 30 withdraws the amount of charge from the account number linked to the tag information. Upon receiving the information including the IC card processing information and the amount of charge from the lane control device 210, the management server 30 executes electronic settlement processing in accordance with the IC card processing information through a credit card company, for example.

Functional Configuration of On-Board Device

Figure 3:
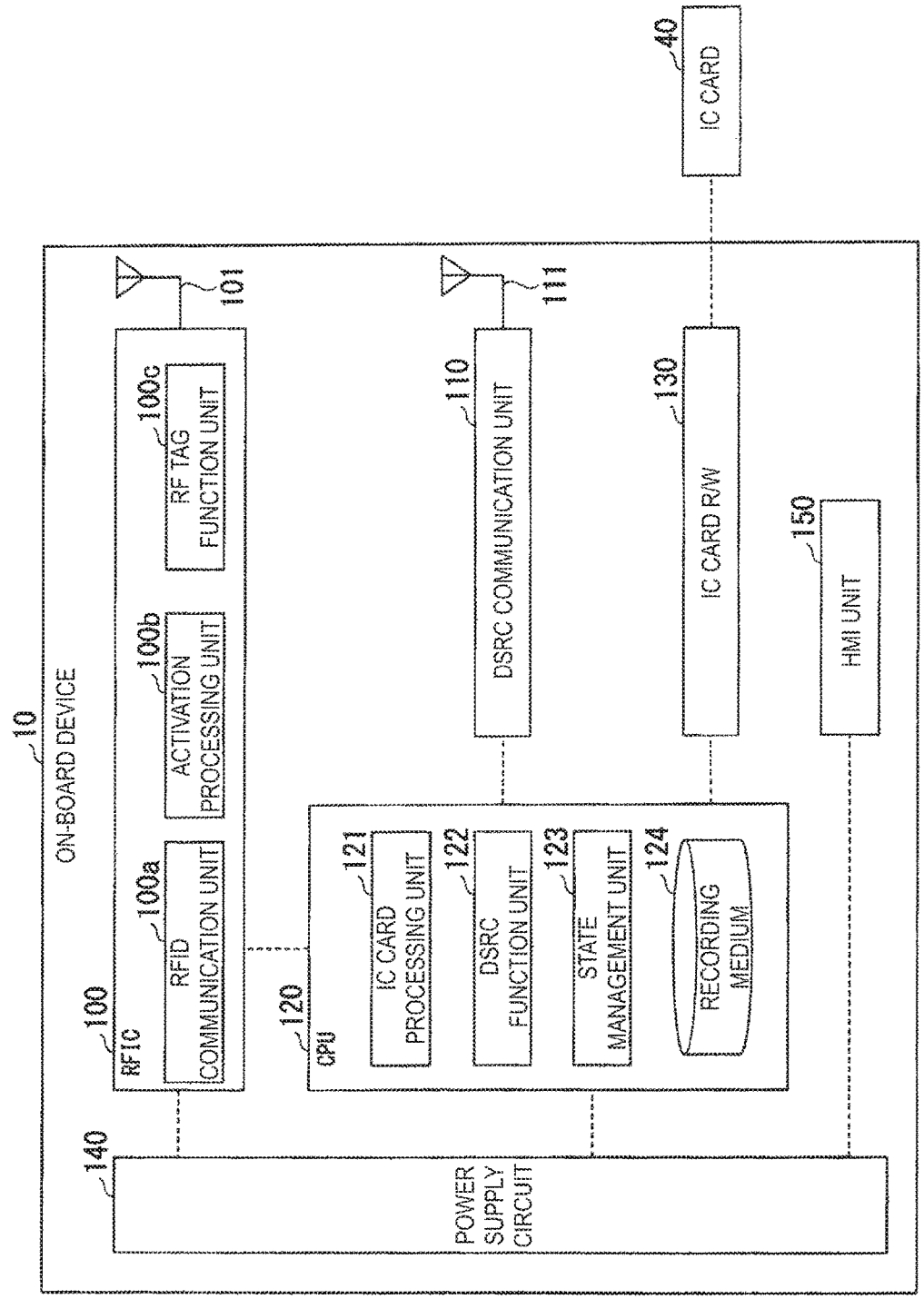
FIG. 3 is a diagram illustrating a functional configuration of an on-board device according to the embodiment of the present invention.

FIG. 3 is a diagram illustrating a functional configuration of the on-board device according to the embodiment of the present invention.

As illustrated in FIG. 3, the on-board device 10 includes the RFIC 100, an RFID antenna 101, the DSRC communication unit 110 (communication unit), a DSRC antenna 111, the CPU 120, the IC card R/W 130, the power supply circuit 140, and the HMI unit 150.

As illustrated in FIG. 3, the RFIC 100 includes an RFID communication unit 100a (communication unit), an activation processing unit 100b, and an RF tag function unit 100c.

The RFID communication unit 100a is configured to receive a radio wave output from the automatic toll collection machine 20 via the RFID antenna 101, and to return a response wave including data generated by the RF tag function unit 100c to the automatic toll collection machine 20.

When the RFID communication unit 100a receives the radio wave, the activation processing unit 100b outputs an activation signal to the CPU 120.

In the present embodiment, upon receiving the radio wave from the automatic toll collection machine 20 via the RFID antenna 101, components (RFID antenna 101, RFID communication unit 100a, activation processing unit 100b, and RF tag function unit 100c) of the RFIC 100 operate with the radio wave served as a power supply. The components of the RFIC 100 can thus operate without being supplied with electric power from the power supply circuit 140.

When the activation processing unit 100b outputs an activation signal to the CPU 120, the CPU 120 is activated. When the power supply circuit 140 supplies electric power to the RFIC 100, the components of the RFIC 100 operate with the electric power.

The RF tag function unit 100c is configured to analyze a command and data included in the radio wave received by the RFID communication unit 100a, and generates and outputs necessary data based on the command and the data. The RF tag function unit 100c is prerecorded with the tag information (unique tag ID) identifying the on-board device 10.

Upon receiving a command asking for tag information, the RF tag function unit 100c reads the prerecorded tag information. The RF tag function unit 100c determines whether the IC card processing information is available from the CPU 120.

When the CPU 120 is activated, and the CPU 120 has read the IC card processing information recorded in the IC card 40, the RF tag function unit 100c sets, as a value of flag information, an "IC card" indicating that the IC card processing information is available. On the other hand, when the CPU 120 is not activated, or, even when the CPU 120 is activated, the CPU 120 has not yet read IC card processing information due to that the IC card 40 is not inserted, for example, the RF tag function unit 100c sets, as a value of flag information, an "RF tag" indicating that no IC card processing information is available.

The RF tag function unit 100c generates data including the tag information and the flag information, and outputs the data to the automatic toll collection machine 20 via the RFID communication unit 100a.

Upon receiving a command asking for outputting of IC card processing information (credit card number, expiration date, and entry information), the RF tag function unit 100c obtains the IC card processing information from the CPU 120, and generates data including the IC card processing information. Upon generating the data including the IC card processing information, the RF tag function unit 100c outputs the data to the automatic toll collection machine 20 via the RFID communication unit 100a.

Upon receiving the data and a command asking for recording of IC card processing information (entry information), the RF tag function unit 100c outputs the data including the IC card processing information to the CPU 120.

Upon receiving the data and a command notifying a result of toll collection processing (e.g., success or failure of toll collection processing, information indicating that toll collection processing is executed by using either of tag information and IC card processing information, amount of charge, and date and time of toll collection processing), the RF tag function unit 100c outputs the data including the result of toll collection processing to the CPU 120.

The DSRC communication unit 110 is coupled to the DSRC antenna 111, and is configured to transmit and receive IC card processing information (credit card number, expiration date, and entry information) and a result of toll collection processing to and from the DSRC roadside device.

The DSRC communication unit 110 includes an activation processing unit (not illustrated). Upon receiving a radio wave for DSRC communication via the DSRC antenna, the DSRC communication unit 110 outputs an activation signal to the CPU 120.

As illustrated in FIG. 3, the CPU 120 includes an IC card processing unit 121, a DSRC function unit 122, a state management unit 123, and a recording medium 124.

FIG. 4 is a diagram for describing an example of IC card processing information according to the embodiment of the present invention.

As illustrated in FIG. 4, when the IC card 40 is inserted into the on-board device 10, the IC card processing unit 121 obtains the credit card number and the expiration date recorded in the IC card 40 via the IC card R/W 130, and records the credit card number and the expiration date in the recording medium 124. When the IC card processing unit 121 determines that the IC card 40 cannot be used due to that an error has occurred in reading the IC card 40 or the IC card 40 is expired, for example, the IC card processing unit 121 does not read the IC card processing information.

As illustrated in FIG. 4, upon receiving the IC card processing information (entry information) output from the RF tag function unit 100c, the IC card processing unit 121 records the IC card processing information in the recording medium 124, and writes the IC card processing information to the IC card 40 via the IC card R/W 130.

When the RF tag function unit 100c asks for IC card processing information, the IC card processing unit 121 outputs the IC card processing information (credit card number, expiration date, and entry information) recorded in the recording medium 124 to the RF tag function unit 100c.

Upon receiving a result of toll collection processing (e.g., success or failure of toll collection processing, information indicating that toll collection processing is executed by using either of tag information and IC card processing information, amount of charge, and date and time of toll collection processing) from the RF tag function unit 100c, the IC card processing unit 121 writes the result of toll collection processing to the IC card 40 via the IC card R/W 130.

The IC card processing unit 121 further outputs a result of reading and writing of the IC card processing information (success or failure of reading of IC card processing information and success or failure of writing of the IC card processing information) from and to the IC card 40 and the result of toll collection processing to the HMI unit 150.

At an entry tollgate provided with a DSRC roadside device, the DSRC function unit 122 obtains entry information on the entry tollgate (tollgate number, and date and time of entry) via the DSRC communication unit 110, and records the entry information in the recording medium 124, as well as records the entry information in the IC card 40 via the IC card processing unit 121.

At an exit tollgate provided with a DSRC roadside device, the DSRC function unit 122 transmits the IC card processing information recorded in the recording medium 124 (credit card number, expiration date, and entry information) to the DSRC roadside device via the DSRC communication unit 110. Upon obtaining a result of toll collection processing (e.g., success or failure of toll collection processing, amount of charge, and date and time of toll collection processing) from the DSRC roadside device via the DSRC communication unit 110, the DSRC function unit 122 records the result of toll collection processing in the IC card 40 via the IC card processing unit 121, as well as outputs the result to the HMI unit 150.

The state management unit 123 is configured to control a state of the CPU 120 based on whether the power supply circuit 140 can supply electric power, whether the RFIC 100 is executing RFID communication, whether the IC card processing unit 121 reads and writes IC card processing information, or whether a user is operating the on-board device 10.

Figure 5:
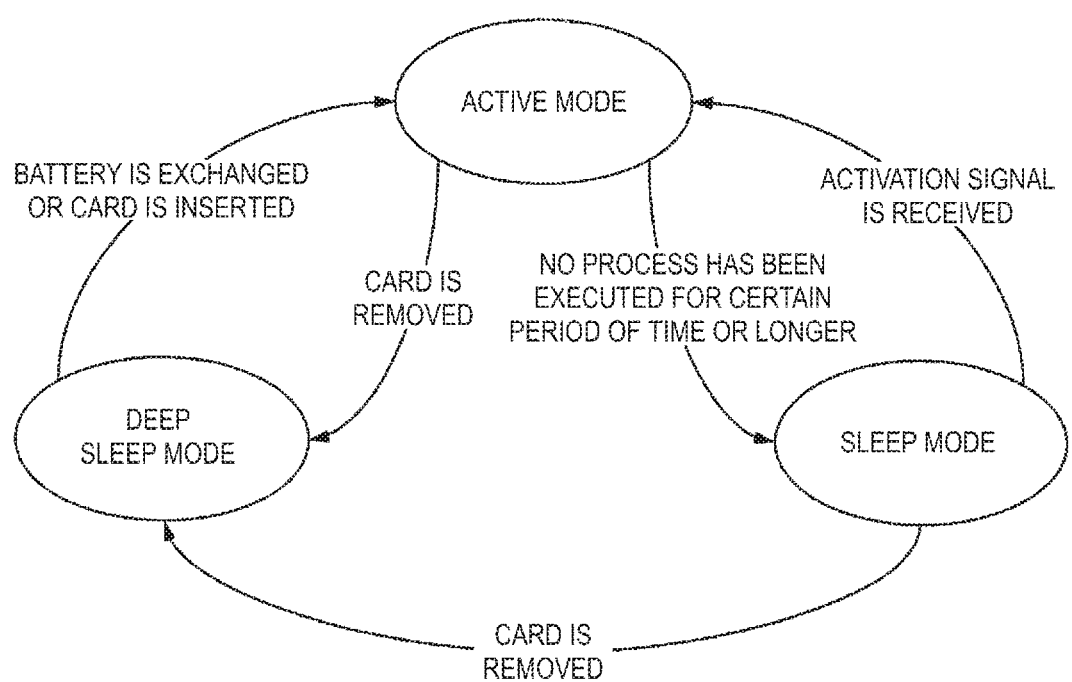
FIG. 5 is a diagram illustrating functions of the on-board device according to the embodiment of the present invention.

FIG. 5 is a diagram illustrating functions of the on-board device according to the embodiment of the present invention.

As illustrated in FIG. 5, the state management unit 123 sets the CPU 120 in one of three states as an "active mode (activated state)", a "sleep mode (deactivated state)", and a "deep sleep mode (power supply disconnected state)". When the CPU 120 is activated, the IC card processing unit 121, the DSRC function unit 122, the state management unit 123, and the recording medium 124 are also activated.

The "active mode" refers to a state when the IC card 40 is inserted into the on-board device 10, electric power is supplied from the power supply circuit 140 to the components of the on-board device 10 (RFIC 100, DSRC communication unit 110, CPU 120, and IC card R/W 130), and thus, the CPU 120 is activated. In the "active mode", the CPU 120 uses electric power supplied from the power supply circuit 140, transmits and receives the IC card processing information to and from the RFIC 100, and reads and writes the IC card processing information from and to the IC card 40 via the IC card R/W 130.

The "sleep mode" refers to a state when the IC card 40 is inserted into the on-board device 10, minimum electric power is supplied from the power supply circuit 140 to the components of the on-board device 10, and thus, the CPU 120 is not activated (deactivated). When the RFID communication unit 100a does not execute RFID communication, when the DSRC communication unit 110 does not execute DSRC communication unit, when a user is not operating the on-board device 10, and when the CPU 120 does not output or record the IC card processing information, and such a period continues for a certain period of time (e.g., ten seconds) or longer, the CPU 120 is turned to the "sleep mode". An amount of electric power to be supplied from the power supply circuit 140 is thus suppressed.

The "deep sleep mode" refers to a state when electric power is not supplied from the power supply circuit 140 to the components of the on-board device 10, and the CPU 120 is not activated. When the power supply circuit 140 cannot supply electric power, or, even when the power supply circuit 140 can supply electric power, the IC card 40 is not inserted into the on-board device 10, the CPU 120 is not supplied with electric power from the power supply circuit 140, and thus is turned to the "deep sleep mode".

As illustrated in FIG. 5, when it has not been detected that the IC card 40 is inserted into the on-board device 10 or it has been detected that the IC card 40 is removed from the on-board device 10 for a certain period of time or longer while the CPU 120 is in the "active mode", the state management unit 123 outputs an electric power supply stop signal to the power supply circuit 140 to turn the CPU 120 to the "deep sleep mode". When the RFID communication unit 100*a* does not execute RFID communication, when the DSRC communication unit 110 does not execute DSRC communication unit, when a user is not operating the on-board device 10, and when the CPU 120 does not output or record the IC card processing information, and such a period continues for a certain period of time or longer while the CPU 120 is in the "active mode", the state management unit 123 turns the CPU 120 to the "sleep mode", and outputs an electric power supply temporal stop signal to the Power supply circuit 140.

When a battery is exchanged, and therefore the power supply circuit 140 can supply electric power, or when the IC card 40 is inserted into the on-board device 10 while the CPU 120 is in the "deep sleep mode", the power supply circuit 140 supplies electric power to the CPU 120. The CPU 120 is thus activated. At this time, the state management unit 123 turns the CPU 120 to the "active mode".

Upon receiving an activation signal output from the activation processing unit 100*b* of the RFIC 100 or the activation processing unit of the DSRC communication unit 110 while the CPU 120 is in the "sleep mode", the state management unit 123 turns the CPU 120 to the "active mode", and outputs an electric power supply start signal to the power supply circuit 140. When it is detected that the IC card 40 is removed from the on-board device 10 while the CPU 120 is in the "sleep mode", the state management unit 123 outputs an electric power supply stop signal to the power supply circuit 140 to turn the CPU 120 to the "deep sleep mode".

As illustrated in FIG. 3, when the IC card 40 is inserted into the on-board device 10, the IC card R/W 130 reads the IC card processing information (credit card number and expiration date) from the IC card 40, and outputs the information to the CPU 120.

The IC card R/W 130 writes the IC card processing information (entry information) or a result of toll collection processing output from the CPU 120 to the IC card 40.

When a remaining amount of the battery in the power supply circuit 140 is enough, and the power supply circuit 140 can supply electric power, the power supply circuit 140 supplies electric power to the components of the on-board device 10 (RFIC 100, DSRC communication unit 110, CPU 120, IC card R/W 130, and HMI unit 150). Upon receiving an electric power supply temporal stop signal from the state management unit 123 of the CPU 120, the power supply circuit 140 supplies electric power to the CPU 120 and the DSRC communication unit 110 only, but stops supplying electric power to the RFIC 100, the IC card R/W 130, and the HMI unit 150 until receiving a next electric power supply start signal.

On the other hand, when a remaining amount of the battery in the power supply circuit 140 is not enough, or the battery is removed, and therefore the power supply circuit 140 cannot supply electric power, the power supply circuit 140 stops supplying of electric power to the components of the on-board device 10. Upon receiving an electric power supply stop signal output from the state management unit 123 of the CPU 120, the power supply circuit 140 stops supplying of electric power to the components of the on-board device 10.

The HMI unit 150 serves as an interface notifying to a user a result of reading and writing of the IC card processing information by the IC card processing unit 121 from and to the IC card 40 or a result of toll collection processing executed for the on-board device 10, and includes a liquid crystal display (LCD) (not illustrated) and a speaker (not illustrated).

The HMI unit 150 causes the LCD to display a result of reading and writing of the IC card processing information received from the IC card processing unit 121 (success or failure of reading of IC card processing information and success or failure of writing of IC card processing information) or a result of toll collection processing received from the IC card processing unit 121 of the CPU 120 or the DSRC communication unit 110 (e.g., success or failure of toll collection processing, information indicating that toll collection processing is executed by using either of tag information and IC card processing information, amount of charge, and date and time of toll collection processing), as well as causes the speaker to output a sound or a buzzer.

Functional Configuration of Automatic Toll Collection Machine

Figure 6:
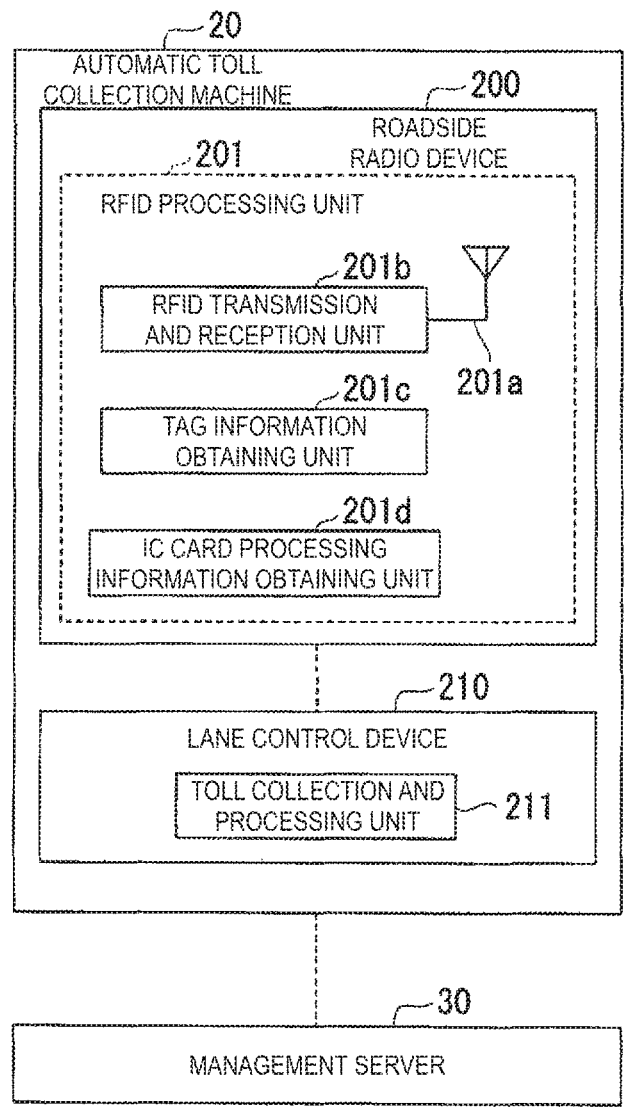
FIG. 6 is a diagram illustrating a functional configuration of an automatic toll collection machine according to the embodiment of the present invention.

FIG. 6 is a diagram illustrating a functional configuration of an automatic toll collection machine according to the embodiment of the present invention.

As illustrated in FIG. 6, the automatic toll collection machine 20 includes the roadside radio device 200 and the lane control device 210. The automatic toll collection machine 20 is coupled to the management server 30 via the wide area communication network.

As illustrated in FIG. 6, the roadside radio device 200 includes an RFID processing unit 201. The RFID processing unit 201 includes an RFID antenna 201*a*, an RFID transmission and reception unit 201*b*, a tag information obtaining unit 201*c*, and an IC card processing information obtaining unit 201*d*.

The RFID antenna 201*a* is configured to transmit and receive a radio wave for RFID communication to and from the on-board device 10.

The RFID transmission and reception unit 201*b* is configured to transmit a radio wave for RFID communication via the RFID antenna 201*a*, and to receive a response wave from the on-board device 10 having received the radio wave.

The tag information obtaining unit 201*c* controls the RFID transmission and reception unit 201*b* to allow the RFID transmission and reception unit 201*b* to transmit a radio wave including a command asking for tag information at a predetermined interval. Upon receiving a response wave from the on-board device 10 having received the radio wave via the RFID transmission and reception unit 201*b*, the tag information obtaining unit 201*c* obtains the tag information and the flag information included in the response wave.

When the flag information represents the "RF tag", the tag information obtaining unit 201*c* outputs the tag information to the lane control device 210. When the lane control device 210 has completed toll collection processing for the on-board device 10 based on the tag information, the tag information obtaining unit 201*c* controls the RFID transmission and reception unit 201*b* to obtain information including a result of the toll collection processing from the lane control device 210, and to transmit a radio wave including the information to the on-board device 10.

On the other hand, when the flag information represents the "IC card", the tag information obtaining unit 201*c* notifies that the IC card processing information is available from the on-board device 10 having transmitted the response wave to the IC card processing information obtaining unit 201*d*. Hereinafter, the tag information obtaining unit 201*c* controls the RFID transmission and reception unit 201*b* to stop transmitting of a radio wave including a command asking for tag information and to prioritize processing in the IC card processing information obtaining unit 201*d* until the IC card processing information obtaining unit 201*d* notifies that toll collection processing is completed.

Upon being notified that the IC card processing information is available from the tag information obtaining unit 201*c*, the IC card processing information obtaining unit 201*d* obtains the IC card processing information from the on-board device 10 via the RFID transmission and reception unit 201*b*.

Specifically, the IC card processing information obtaining unit 201*d* controls the RFID transmission and reception unit 201*b* to transmit a radio wave including a command asking for IC card processing information. Upon receiving a response wave from the on-board device 10 having received the radio wave via the RFID transmission and reception unit 201*b*, the IC card processing information obtaining unit 201*d* obtains the IC card processing information (credit card number, expiration date, and entry information) included in the response wave.

The IC card processing information obtaining unit 201*d* outputs the obtained IC card processing information to the lane control device 210. When the lane control device 210 has completed toll collection processing for the on-board device 10 based on the IC card processing information, the IC card processing information obtaining unit 201*d* controls the RFID transmission and reception unit 201*b* to obtain information including a result of the toll collection processing from the lane control device 210, and to transmit a radio wave including the information to the on-board device 10, as well as to notify that the toll collection processing is completed to the tag information obtaining unit 201*c*.

As illustrated in FIG. 6, the lane control device 210 includes a toll collection and processing unit 211.

The toll collection and processing unit 211 is configured to execute toll collection processing for the on-board device 10 based on tag information or IC card processing information received from the roadside radio device 200.

Upon receiving the tag information from the roadside radio device 200, the toll collection and processing unit 211 obtains entry information linked to the tag information from the management server 30. The toll collection and processing unit 211 calculates an amount to be charged to the on-board device 10 based on the obtained entry information to execute toll collection processing. The toll collection and processing unit 211 then transmits, to the management server 30, the tag information of the on-board device 10 and the amount of charge linked to each other.

Upon receiving the IC card processing information from the roadside radio device 200, the toll collection and processing unit 211 obtains the credit card number, the expiration date, and the entry information included in the IC card processing information. The toll collection and processing unit 211 calculates an amount to be charged to the on-board device 10 based on the obtained IC card processing information to execute toll collection processing. The toll collection and processing unit 211 then transmits, to the management server 30, the IC card processing information of the on-board device 10 and the amount of charge linked to each other.

Upon completion of the toll collection processing, the toll collection and processing unit 211 outputs information including a result of the toll collection processing to the on-board device 10 via the roadside radio device 200.

Processing Flow of On-Board Device

Figure 7:
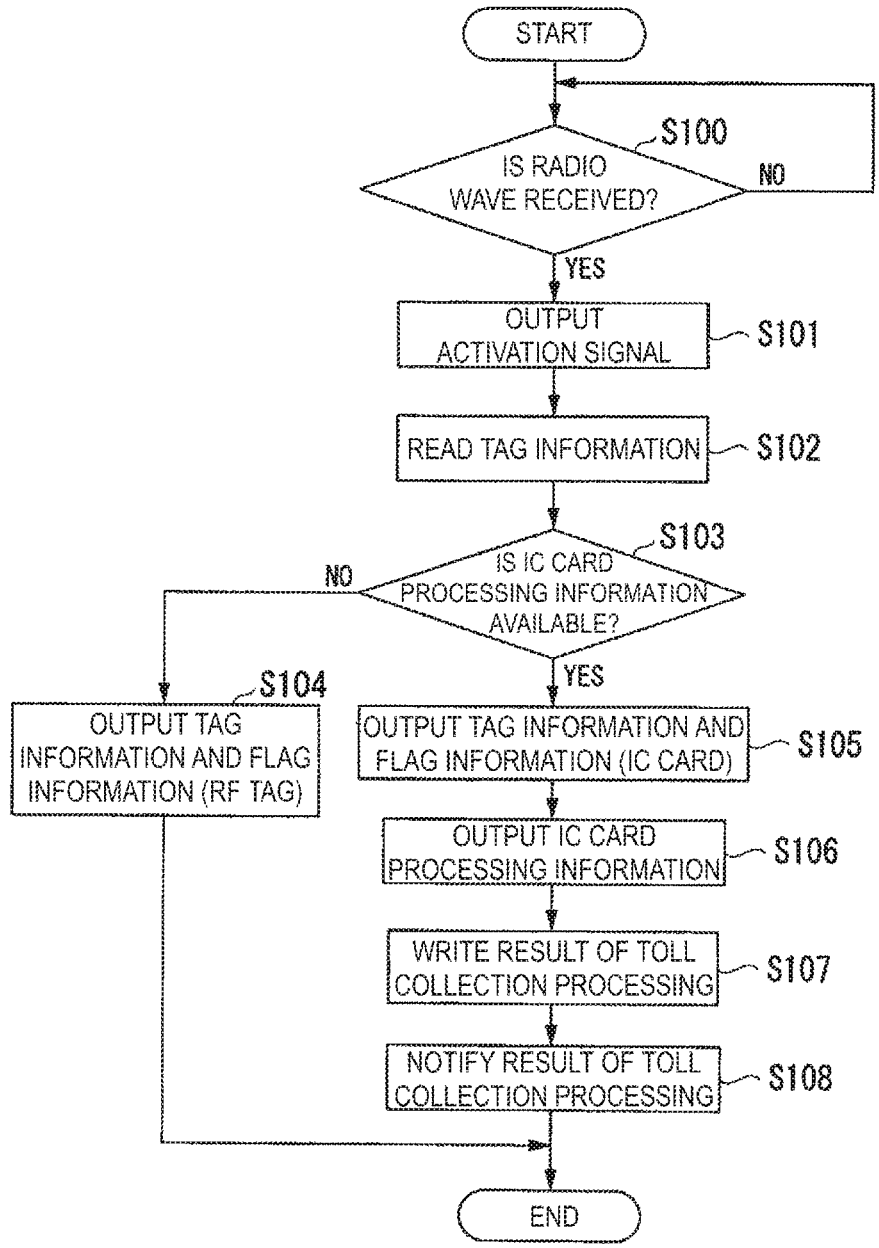
FIG. 7 is a diagram illustrating a processing flow of the on-board device according to the embodiment of the present invention.

FIG. 7 is a diagram illustrating a processing flow of the on-board device according to the embodiment of the present invention.

As illustrated in FIG. 7, the activation processing unit 100*b* of the RFIC 100 determines whether a radio wave is received from the automatic toll collection machine 20 via the RFID communication unit 100*a* (step S100).

When no radio wave is received from the automatic toll collection machine 20 (step S100: NO), the activation processing unit 100*b* waits until a radio wave is received.

Upon receiving a radio wave from the automatic toll collection machine 20 (step S100: YES), the activation processing unit 100*b* outputs an activation signal to the CPU 120 (step S101).

Next, the RF tag function unit 100*c* of the RFIC 100 reads the prerecorded tag information (step S102).

Next, the RF tag function unit 100*c* determines whether the IC card processing information is available from the CPU 120 (step S103).

When the activation signal received from the activation processing unit 100*b* shows that the CPU 120 is in the "active mode", and the CPU 120 has read the IC card processing information recorded in the IC card 40, the RF tag function unit 100*c* determines that the IC card processing information is available (step S103: YES).

On the other hand, when the CPU 120 is in another state than the "active mode" or when the CPU 120 has not yet read the IC card processing information recorded in the IC card 40, the RF tag function unit 100*c* determines that no IC card processing information is available (step S103: NO).

When the IC card processing unit 121 has not yet obtained the IC card processing information (step S103: NO), the RF tag function unit 100*c* sets the "RF tag" indicating that no IC card processing information is available, as a value of flag information. The RF tag function unit 100*c* generates data including the tag information and the flag information ("RF tag") read in step S102, and outputs the data to the automatic toll collection machine 20 via the RFID communication unit 100*a* (step S104).

On the other hand, upon determining that the IC card processing information is available (step S103: YES), the RF tag function unit 100*c* sets the "IC card" indicating that IC card processing information is available, as a value of flag information. The RF tag function unit 100*c* generates data including the tag information and the flag information ("IC card") read in step S102, and outputs the data to the automatic toll collection machine 20 via the RFID communication unit 100*a* (step S105).

After the tag information and the flag information ("IC card") have been output in step S105, when the automatic toll collection machine 20 asks for IC card processing information, the RF tag function unit 100*c* obtains the IC card processing information (credit card number, expiration date, and entry information) from the IC card processing unit 121 of the CPU 120. The RF tag function unit 100*c* then outputs the IC card processing information to the automatic toll collection machine 20 via the RFID communication unit 100*a* (step S106).

Next, upon receiving a result of toll collection processing from the automatic toll collection machine 20, the RF tag function unit 100*c* outputs the result of toll collection processing to the CPU 120. Upon receiving the result of toll collection processing from the RF tag function unit 100c, the IC card processing unit 121 of the CPU 120 writes the result of toll collection processing to the IC card 40 via the IC card R/W 130 (step S107).

The IC card processing unit 121 outputs the result of toll collection processing to the HMI unit 150. The HMI unit 150 notifies the result of toll collection processing received from the IC card processing unit 121 to the user via the LCD and the speaker (step S108).

Processing Flow of Automatic Toll Collection Machine

Figure 8:
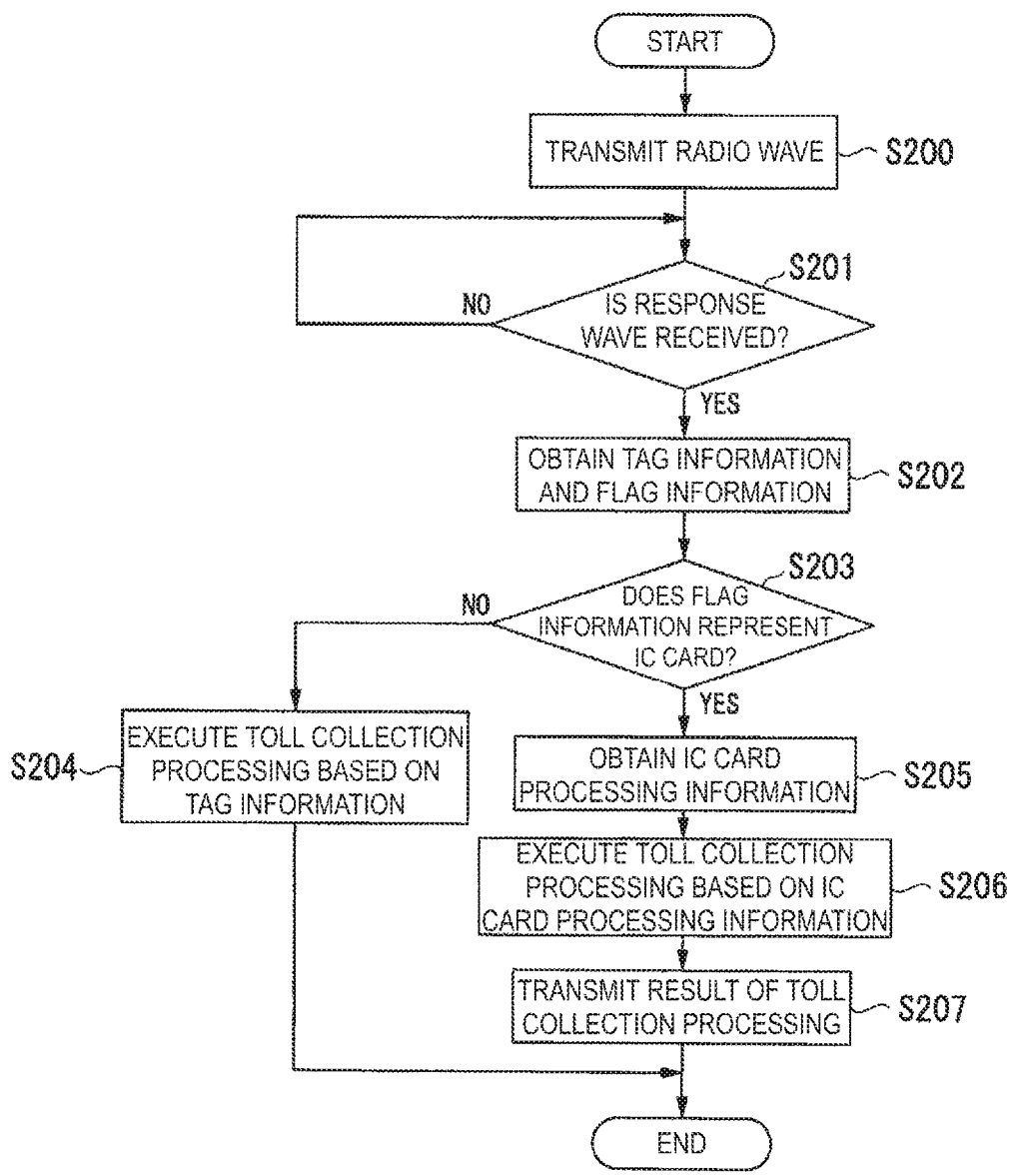
FIG. 8 is a diagram illustrating a processing flow of the automatic toll collection machine according to the embodiment of the present invention.

FIG. 8 is a diagram illustrating a processing flow of the automatic toll collection machine according to the embodiment of the present invention.

As illustrated in FIG. 8, the tag information obtaining unit 201c of the roadside radio device 200 transmits a radio wave including a command asking for tag information via the RFID transmission and reception unit 201b at a predetermined interval (step S200).

Next, the tag information obtaining unit 201c determines whether a response wave is received from the on-board device 10 (step S201).

Upon determining that no response wave is received from the on-board device 10 (step S201: NO), the tag information obtaining unit 201c repeats processing of step S200 until a response wave is received.

On the other hand, upon determining that a response wave is received from the on-board device 10 (step S201: YES), the tag information obtaining unit 201c obtains the tag information and the flag information included in the response wave (step S202).

Next, the tag information obtaining unit 201c determines whether the flag information represents the "IC card" (step S203).

When the flag information represents the "RF tag" (step S203: NO), the tag information obtaining unit 201c outputs the tag information to the lane control device 210. The toll collection and processing unit 211 of the lane control device 210 having received the tag information executes toll collection processing for the on-board device 10 based on the tag information (step S204).

On the other hand, when the flag information represents the "IC card" (step S203: YES), the tag information obtaining unit 201c notifies that the IC card processing information is available to the IC card processing information obtaining unit 201d.

Upon being notified that the IC card processing information is available from the tag information obtaining unit 201c, the IC card processing information obtaining unit 201d obtains the IC card processing information from the on-board device 10 via the RFID transmission and reception unit 201b (step S205). The IC card processing information obtaining unit 201d outputs the obtained IC card processing information to the lane control device 210.

The toll collection and processing unit 211 of the lane control device 210 having obtained the IC card processing information executes toll collection processing for the on-board device 10 based on the IC card processing information (step S206).

When the lane control device 210 has completed the toll collection processing for the on-board device 10 based on the IC card processing information, the IC card processing information obtaining unit 201d obtains information including a result of the toll collection processing from the lane control device 210, and transmits a radio wave including the information to the on-board device 10 via the RFID transmission and reception unit 201b (step S207).

Operational Effects

As described above, the on-board device 10 according to the present embodiment includes the RFIC 100 including the activation processing unit 100b configured to output an activation signal upon receiving a radio wave for RFID communication, and the RF tag function unit 100c configured to read prerecorded tag information; the IC card processing unit 121 configured to be activated based on the activation signal when electric power is supplied from the power supply circuit 140, and to read and write IC card processing information from and to the IC card 40; and the RFID communication unit 100a configured to transmit at least either of the tag information and the IC card processing information to the automatic toll collection machine 20.

With the above described configuration, the IC card processing unit 121 of the CPU 120 is activated based on an activation signal output from the activation processing unit 100b upon receiving a radio wave for RFID communication. The communication unit (RFID communication unit 100a or DSRC communication unit 110) transmits at least either of the tag information and the IC card processing information to the automatic toll collection machine 20 in accordance with a predetermined processing condition (in accordance with a processing state in the IC card processing unit 121). Even on a toll road adopted with a toll collection system configured to execute toll collection processing via RFID communication, toll collection processing using IC card can be executed.

When the IC card 40 is inserted into the on-board device 10, the RF tag function unit 100c of the RFIC 100 obtains the IC card processing information read by the IC card processing unit 121 of the CPU 120 from the IC card 40, and transmits the information to the automatic toll collection machine 20.

With the above described configuration, when the on-board device 10 is inserted with the IC card 40, and the IC card processing information is read, the on-board device 10 executes electronic settlement processing based on the IC card processing information under a supposition that a user wants to pay a toll with the IC card 40.

In the present embodiment, when the IC card 40 is inserted into the on-board device, the IC card processing unit 121 reads the IC card processing information from the IC card 40, and records the information in the recording medium 124. When toll collection processing is executed at a tollgate, the IC card processing unit 121 can promptly read the IC card processing information recorded in the recording medium 124, facilitating electronic settlement processing.

When no IC card processing information is available due to that the IC card 40 is not inserted into the on-board device 10, for example, the RF tag function unit 100c reads the tag information prerecorded in the RF tag function unit 100c, and transmits the information to the automatic toll collection machine 20.

With the above described configuration, when no IC card processing information is read due to that the IC card 40 is not inserted into the on-board device 10, for example, the on-board device 10 executes electronic settlement processing based on the tag information under a supposition that a user wants to pay a toll with the tag information.

The RFIC 100 can operate with, as a power supply, a radio wave for RFID communication received from the automatic toll collection machine 20. Even when the power supply circuit 140 is not able to supply electric power, the tag information can be transmitted to the automatic toll collection machine 20 via RFID communication to execute electronic settlement processing based on the tag information.

Even though the IC card 40 is inserted into the on-board device 10, when no IC card processing information is read due to that an error has occurred in reading the IC card 40, for example, the on-board device 10 can execute electronic settlement processing based on the tag information.

Regardless of a state of the power supply circuit 140 of the on-board device 10 or regardless of whether IC card processing information is available, the vehicle A can smoothly pass through the tollgate.

The on-board device 10 further includes the DSRC communication unit 110 configured to transmit the IC card processing information read by the IC card processing unit upon receiving a radio wave for DSRC communication.

With the above described configuration, the on-board device 10 can automatically identify the automatic toll collection machine 20 configured to execute toll collection processing via RFID communication and a DSRC roadside device configured to execute toll collection processing via DSRC communication to execute electronic settlement processing in accordance with either of the toll collection systems. The on-board device 10 can smoothly complete electronic settlement for a toll without requiring a user to be aware that a toll road being traveling is adopted with either of the toll collection systems.

The CPU 120 of the on-board device 10 includes the state management unit 123. When the RFID communication unit 100a does not execute RFID communication for a certain period of time or longer, the state management unit 123 turns the CPU 120 to the "sleep mode" (deactivated state).

At this time, the state management unit 123 outputs an electric power supply temporal stop signal to the power supply circuit 140. The power supply circuit 140 having received the electric power supply temporal stop signal supplies electric power to the CPU 120 and the DSRC communication unit 110 of the on-board device 10 only, but stops supplying electric power to the RFIC 100, the IC card R/W 130, and the HMI unit 150.

With the above described configuration, in the on-board device 10, the IC card processing unit 121 is deactivated while no electronic settlement processing is executed, saving electric power to be supplied from the power supply circuit 140.

Even when the CPU 120 is in the "sleep mode" (deactivated state), when the RFIC 100 of the on-board device 10 receives a radio wave for RFID communication, the activation processing unit 100b of the RFIC 100 outputs an activation signal to the CPU 120. Based on the activation signal, the state management unit 123 turns the CPU 120 to the "active mode" (activated state), and outputs an electric power supply start signal to the power supply circuit 140. Being supplied with electric power again from the power supply circuit 140, the components of the on-board device 10 can execute electronic settlement based on the tag information or the IC card 40. Being supplied with electric power from the power supply circuit 140 to the RFIC 100, the RF communication unit 100a of the RFIC 100 can output a response wave having enough strength for transmitting the IC card processing information.

The automatic toll collection machine 20 according to the present embodiment includes the RFID transmission and reception unit 201b configured to transmit a radio wave for RFID communication at a predetermined interval, and to receive a response wave to the radio wave for RFID communication from the on-board device 10 mounted on the vehicle A, and the toll collection and processing unit 211 configured to execute, when the response wave includes tag information, toll collection processing based on the tag information, and to execute, when the response wave includes IC card processing information, toll collection processing based on the IC card processing information.

With the above described configuration, the toll collection and processing unit 211 can execute both toll collection processing based on tag information and toll collection processing based on IC card processing information, based on information transmitted from the on-board device 10. Even when the on-board device 10 is not mounted on the vehicle A, but only an RF tag is attached, the toll collection and processing unit 211 can execute toll collection processing for the vehicle A.

While the certain embodiment has been described, the embodiment has been presented by way of example only, and is not intended to limit the scope of the invention. The embodiment may be implemented in various other forms, and various omissions, substitutions, and alterations may be made without departing from the gist of the invention. The embodiment and modifications are included in the scope and gist of the invention and are also included in the scope of the invention described in the claims and equivalents thereof.

For example, in the embodiment described above, an aspect has been described. In the aspect, entry information is read and write from and to the IC card 40 or the recording medium 124 as IC card processing information. However, the present invention is not limited to the aspect.

On a toll road set with a fixed amount of charge regardless of an entry tollgate or an exit tollgate that a vehicle passes through, entry information may not be read and written from and to the IC card 40 or the recording medium 124 as IC card processing information.

In the embodiment described above, an aspect has been described. In the aspect, upon receiving a radio wave for RFID communication from the automatic toll collection machine 20, the RFIC 100 of the on-board device 10 transmits tag information or IC card processing information to the automatic toll collection machine 20 via the RFID communication unit 100a. However, the present invention is not limited to the aspect.

When the RFIC 100 receives a radio wave for RFID communication transmitted from the automatic toll collection machine 20, the IC card processing unit 121 of the CPU 120 being activated due to an activation signal may transmit IC card processing information to the automatic toll collection machine 20 via another communication means than RFID communication. As the other communication means, the on-board device 10 may include a communication unit conforming to a communicate method, such as the third generation mobile communication system. As the other communication means, the DSRC communication unit 110 may be used. The DSRC communication unit 110 is not an essential component.

INDUSTRIAL APPLICABILITY

With the on-board device, the automatic toll collection machine, the toll collection system, and the toll collection method, described above, on a toll road adopted with a toll collection system configured to execute toll collection processing via RFID communication, the toll collection processing using an IC card can be executed.

REFERENCE SIGNS LIST

1 Toll collection system
10 On-board device
100 RFIC

100a RFID communication unit
100b Activation processing unit
100c RF tag function unit
101 RFID antenna
110 DSRC communication unit
111 DSRC antenna
120 CPU
121 IC card processing unit
122 DSRC function unit
123 State management unit
124 Recording medium
130 IC card R/W
140 Power supply circuit
150 HMI unit
20 Automatic toll collection machine
200 Roadside radio device
201 RFID processing unit
201a RFID antenna
201b RFID transmission and reception unit
201c Tag information obtaining unit
201d IC card processing information obtaining unit
210 Lane control device
211 Toll collection and processing unit
30 Management server
40 IC card
A Vehicle
G Gantry
L Lane

The invention claimed is:

1. An on-board device comprising:
a radio frequency integrated circuit (RFIC) including:
an activation processing unit configured to output an activation signal upon receiving a radio wave for radio frequency identifier (RFID) communication; and
a radio frequency (RF) tag function unit configured to read prerecorded tag information;
an integrated circuit (IC) card processing unit configured to be activated based on the activation signal when electric power is supplied from a power supply circuit, and to read and write IC card processing information from and to an IC card; and
a communication unit configured to transmit at least either of the tag information and the IC card processing information to an external device.

2. The on-board device according to claim 1,
wherein the RFIC includes an RFID communication unit as the communication unit, and
the RFID communication unit is configured to transmit, when the IC card processing information is read by the IC card processing unit, the IC card processing information to the external device.

3. The on-board device according to claim 2, wherein the RFID communication unit is configured to transmit, when the IC card processing information is not read by the IC card processing unit, the tag information to the external device.

4. The on-board device according to claim 2, further comprising a dedicated short range communications (DSRC) communication unit configured to transmit the IC card processing information read by the IC card processing unit upon receiving a radio wave for DSRC communication.

5. The on-board device according to claim 1, wherein the IC card processing unit is deactivated when no communication takes place between the communication unit and the external device for a certain period of time or longer.

6. A toll collection system comprising:
the on-board device according to claim 1; and
an automatic toll collection machine configured to execute toll collection processing for an incoming vehicle, the automatic toll collection machine comprising:
a radio frequency identifier (RFID) transmission and reception unit configured to transmit a radio wave for RFID communication at a predetermined interval, and to receive a response wave to the radio wave for RFID communication from an on-board device mounted on the vehicle; and
a toll collection and processing unit configured to execute, when the response wave includes tag information, toll collection processing based on the tag information, and to execute, when the response wave includes integrated circuit (IC) card processing information, toll collection processing based on the IC card processing information.

7. An automatic toll collection machine configured to execute toll collection processing for an incoming vehicle, the automatic toll collection machine comprising:
a radio frequency identifier (RFID) transmission and reception unit configured to transmit a radio wave for RFID communication at a predetermined interval, and to receive a response wave to the radio wave for RFID communication from an on-board device mounted on the vehicle;
an IC card processing information obtaining unit configured to obtain integrated circuit (IC) card processing information from the on-board device when the response wave includes flag information indicating that the IC card processing information is able to be obtained;
a tag information obtaining unit configured to obtain tag information from the on-board device when the response wave does not include the flag information indicating that the IC card processing information is able to be obtained; and
a toll collection and processing unit configured to execute toll collection processing based on the tag information obtained by the tag information obtaining unit or the IC card processing information obtained by the IC card processing information obtaining unit.

8. The automatic toll collection machine according to claim 7, wherein the tag information obtaining unit is further configured to stop processing of obtaining the tag information from the on-board device when the response wave includes the flag information indicating that the IC card processing information is able to be obtained.

9. A data communication method comprising:
a step of outputting an activation signal, and of reading prerecorded tag information upon receiving a radio wave for radio frequency identifier (RFID) communication by a radio frequency integrated circuit (RFIC);
a step of reading and writing integrated circuit (IC) card processing information from and to an IC card by a CPU which establishes an activated state when electric power is supplied from a power supply circuit; and
a step of transmitting at least either of the tag information and the IC card processing information to an external device by the RFIC.

10. A toll collection method configured to execute toll collection processing for an incoming vehicle, the toll collection method comprising:
a step of transmitting a radio wave for radio frequency identifier (RFID) communication at a predetermined interval, and of receiving a response wave to the radio wave for RFID communication from an on-board device mounted on the vehicle;

a step of obtaining integrated circuit (IC) card processing information from the on-board device when the response wave includes flag information indicating that the IC card processing information is able to be obtained;

a step of obtaining tag information from the on-board device when the response wave does not include the flag information indicating that the IC card processing information is able to be obtained; and a step of executing toll collection processing based on the obtained tag information or the obtained IC card processing information.

* * * * *